United States Patent [19]
Takamiya et al.

[11] Patent Number: 5,774,218
[45] Date of Patent: Jun. 30, 1998

[54] LASER DOPPLER VELOCIMETER WITH ELECTRO-OPTICAL CRYSTAL

[75] Inventors: Makoto Takamiya, Tokyo; Hidejiro Kadowaki, Yokohama, both of Japan

[73] Assignee: Canon Kabushiki Kaisha, Tokyo, Japan

[21] Appl. No.: 509,936

[22] Filed: Aug. 1, 1995

[30]    Foreign Application Priority Data

Aug. 3, 1994  [JP]  Japan .................................. 6-182299

[51] Int. Cl.$^6$ .............................. G01B 11/02; G01P 3/36; G01N 21/00
[52] U.S. Cl. .......................... 356/356; 356/28; 356/28.5; 250/561
[58] Field of Search ........................... 356/375, 28, 28.5, 356/356, 349; 250/561; 350/358; 372/13, 29, 32; 385/2, 8

[56]    References Cited

U.S. PATENT DOCUMENTS

| | | | |
|---|---|---|---|
| 3,935,543 | 1/1976 | Eguchi et al. ......................... | 331/94.5 |
| 4,221,463 | 9/1980 | Barsack et al. ........................ | 350/150 |
| 4,229,073 | 10/1980 | Lotspeica ................................ | 359/315 |
| 4,343,536 | 8/1982 | Watanabe et al. ...................... | 359/315 |
| 4,990,791 | 2/1991 | Nishi ....................................... | 250/561 |
| 5,229,830 | 7/1993 | Ishida et al. ............................. | 356/28.5 |
| 5,267,011 | 11/1993 | Callender .................................. | 356/5 |
| 5,526,109 | 6/1996 | Johnson ................................... | 356/28.5 |

FOREIGN PATENT DOCUMENTS 0 317 352  5/1989  European Pat. Off. .
0 391 278  10/1990  European Pat. Off. .

OTHER PUBLICATIONS

Nishiwaki, A., et al., "The DC Characteristics of the Periodic Skin–Field–Electrooptic Light Modulator," IEEE Journal of Quantum Electronics, vol. QE–9, No. 6, pp. 559–563 (Jun. 1973).

Pfeifer, H.J., "A New Optical System for Three–Dimensional Laser–Doppler–Anemometry Using an Argon–Ion and a Dye Laser," ICIACF '85 Record, Stanford University USA, pp. 56–62 (Aug. 1985).

Foord, R., et al, "A Solid–state Electro–optic Phase Modulator for Laser Doppler Anemometry," J. Phys. D: Appl. Phys., vol. 7, pp. L36–L39, (1974).

*Primary Examiner*—Frank G. Font
*Assistant Examiner*—Michael P. Stafira
*Attorney, Agent, or Firm*—Fitzpatrick, Cella,, Harper & Scinto

[57]    ABSTRACT

An apparatus for detecting the displacement information of an object to be measured has a light source, an electro-optical crystal disposed at the incidence position of a light beam from the light source, the light beam being modulated in the electro-optical crystal, the light beam being internally reflected at least once in the electro-optical crystal and emerging therefrom, and a light receiving element for receiving the light from the object to be measured to which the light beam having emerged from the electro-optical crystal is applied, the displacement information of the object to be measured being detected by the light reception of the light receiving element.

12 Claims, 5 Drawing Sheets

LASER DOPPLER VELOCIMETER WITH ELECTRO-OPTICAL CRYSTAL

BACKGROUND OF THE INVENTION

1. Field of the Invention

This invention relates to an optical type displacement detecting apparatus for measuring the displacement information of a moving object without contacting the object. The present invention can be applied particularly well to an optical type displacement detecting apparatus utilizing the shift of the frequency of a laser beam.

2. Related Background Art

A laser Doppler velocimeter (LDV) or a laser encoder (a displacement amount measuring apparatus) have heretofore been used as an apparatus for measuring the displacement information of an object and highly accurately. The laser Doppler velocimeter utilizes the effect that a laser beam is applied to a moving object or fluid and the frequency of light scattered by the moving object or the moving fluid shifts in proportion to the moving velocity, to measure the moving velocity of the moving object or the moving fluid.

An example of the laser Doppler velocimeter according to the prior art is shown in FIG. 1 of the accompanying drawings.

The reference numeral 1 designates a laser, the reference numeral 2 denotes a collimator lens, the reference numeral 3 designates a parallel light beam, the reference numeral 4 denotes a beam splitter, the reference characters 6a, 6b, 6c and 6d designate mirrors, the reference numeral 7 denotes an object to be measured moving at a velocity V in the direction of arrow, the reference numeral 8 designates a condensing lens, and the reference numeral 9 denotes a photodetector.

A laser beam emitted from the laser 1 is made into the parallel light beam 3 by the collimator lens 2 and is divided into two light beams 5a and 5b, which are reflected by the mirrors 6a, 6c and 6b, 6d, whereafter the two light beams are applied to the object to be measured moving at the velocity V, at an angle of incidence θ. The scattered light by the object or fluid is detected by the photodetector 9 through the condensing lens 8. The frequencies of the scattered light by the two light beams are subjected to Doppler shifts of $+\Delta f$ and $-\Delta f$, respectively, in proportion to the moving velocity V. If here, the wavelength of the laser beam is λ, $\Delta f$ can be expressed by the following equation (1):

$$\Delta f = V \cdot \sin(\theta)/\lambda \qquad (1)$$

The scattered light subjected to the Doppler shifts of $+\Delta f$ and $-\Delta f$ interfere with each other and bring about a change in light and shade on the light receiving surface of the photodetector 9, and the frequency F thereof is given by the following equation (2):

$$F = 2 \cdot \Delta f = 2 \cdot V \cdot \sin(\theta)/\lambda \qquad (2)$$

If the frequency F of the photodetector 9 (hereinafter referred to as the Doppler frequency) is measured from equation (2), the velocity V of the object 7 to be measured can be found.

Generally, when light of high coherency such as a laser beam is applied to an object, scattered light is subjected to random phase modulation by the minute unevenness of the surface of the object to thereby form a spotted pattern, i.e., a so-called speckle pattern, on an observation surface. In the laser Doppler velocimeter, when an object or fluid moves, the change in light and shade by the Doppler shift on the detecting surface of the photodetector is modulated by an irregular change in light and shade by the flow of the speckle pattern and the output signal of the photodetector is also subjected to modulation by a change in the transmittance (or reflectance) of the object to be measured.

In the aforedescribed LDV, generally the frequency of the change in light and shade by the flow of the speckle pattern and the frequency of the change in the transmittance (or reflectance) of the object to be measured are low as compared with the Doppler frequency shown in the aforementioned equation (2) and therefore, use is made of a method of passing the output of the photodetector through a high-pass filter to thereby electrically eliminate a low frequency component and take out a Doppler signal only. However, if the velocity of the object to be measured is low and the Doppler frequency is low, there will arise the disadvantage that the frequency difference thereof from a low frequency fluctuation component becomes small and the high-pass filter becomes unusable and the velocity of the object to be measured cannot be measured. Further, the direction of velocity cannot be detected in principle.

As a technique of enabling the measurement including the direction of velocity from a stationary state, there is a method of providing a frequency difference before two light beams are applied to an object to be measured (a frequency shifter).

FIG. 2 of the accompanying drawings shows an example of the frequency shifter by electro-optical crystal.

The electro-optical crystal is one in which the refractive index of a medium is varied by an electric field applied thereto, and as such crystal, there are $LiNbO_3$ and $LiTaO_3$ of trigonal system 3 m and $(NH_4)H_2PO_4$(ADP) and $KH_2PO_4$ (KDP) of tetragonal system 42 m. When the varying voltage of a voltage applied to this crystal per unit time is made constant, light after transmitted through $LiNbO_3$ becomes constant in the amount of phase variation per unit time. That is, the crystal becomes a frequency shifter. In reality, when the voltage is varied always constantly, the voltage becomes infinitely great and therefore, saw tooth wave (serodyne) driving as shown in FIG. 3 of the accompanying drawings is effected. Driving is effected at a value in which the voltage amplitude corresponding to a light phase $2\pi$ so that the light phase may not become discontinuous in a falling portion.

Assuming here that the wavelength λ of the light beam I is λ=780 mm and d=1 mm and l=20 mm, the value in which the voltage amplitude corresponds to the light phase $2\pi$ is V≃−230 V, and when the serodyne frequency is fR, the light beam I frequency-shifts by fR.

FIG. 4 of the accompanying drawings shows an example of the laser Doppler velocimeter utilizing the above-described principle which is described by Foord et al. (J. Phys. D: Appl. Phys., Vol. 7, pp L36–L39 (1974)). A light beam from a light source is separated into two light beams by a beam splitter 4, and the two light beams are deflected by mirrors 6a and 6b, whereafter they are transmitted through electro-optical crystals 110a and 110b. The two light beams frequency-shifted by serodyne driving are deflected by a lens 15 and the light beams intersect each other in their converged state. This construction is a form which is utilized chiefly as a current meter, and enables measurement including the direction of velocity from a stationary state.

In such an example to which is applied the frequency shifter using electro-optical crystals, the Doppler frequency becomes as follows by the frequency difference fR between the two light beams:

$$F = 2 \cdot V \cdot \sin(\theta)/\lambda + fR \qquad (3)$$

Consequently, even when the velocity V of the object 7 to be measured is low, if fR is set to a suitable value, the frequency difference from the low frequency component attributable to the flow of the aforedescribed speckle pattern and the variation in the transmittance (or reflectance) of the object to be measured can be taken sufficiently, and by electrically eliminating the low frequency component and taking out the Doppler signal only, velocity detection becomes possible.

The construction as shown in FIG. 4, however, has suffered from the problem that the number of additional members such as mirrors becomes great and downsizing is difficult.

SUMMARY OF THE INVENTION

In view of the above-noted disadvantages peculiar to the prior art, the present invention has as an object thereof the provision of an optical type displacement detecting apparatus in which the number of parts can be reduced to thereby achieve downsizing.

Other objects of the present invention will become apparent from the following detailed description of some embodiments of the invention.

DESCRIPTION OF THE PREFERRED EMBODIMENTS

Figure 1:
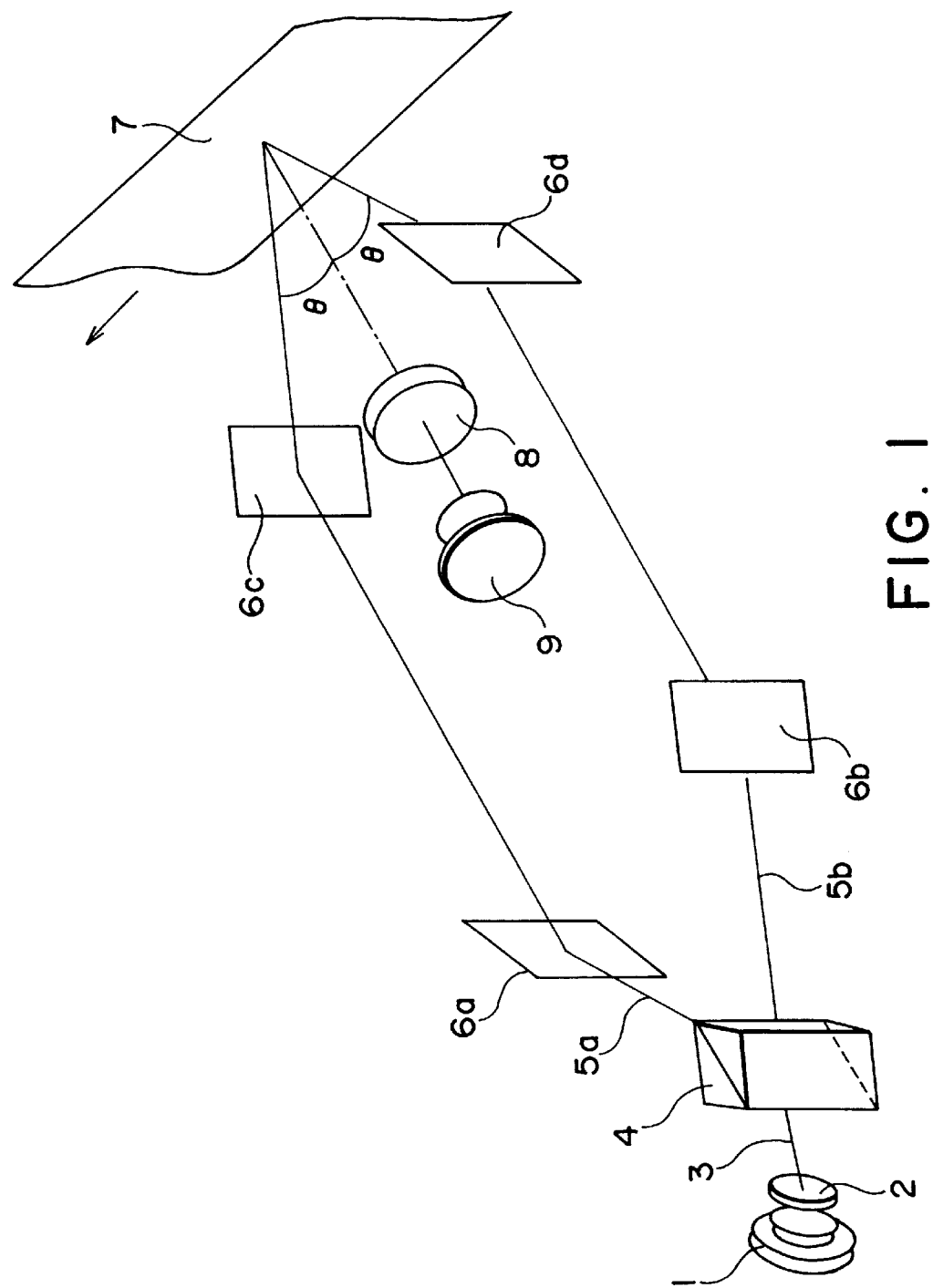
FIG. 1 shows an example of the laser Doppler velocimeter according to the prior art.
Figure 3:
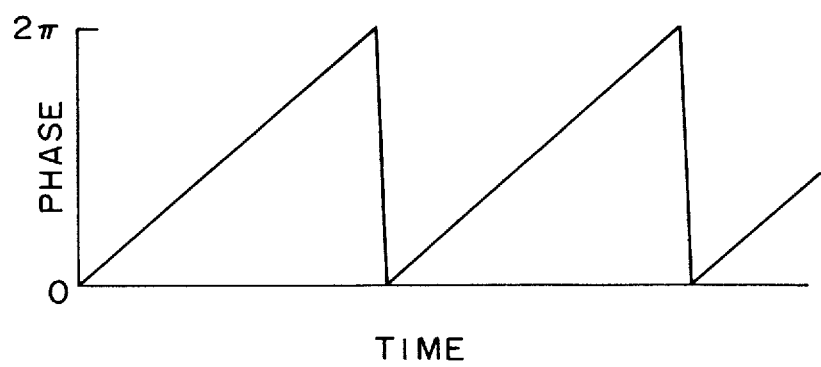
FIG. 3 is a graph illustrating saw tooth wave (serodyne) driving.
Figure 4:
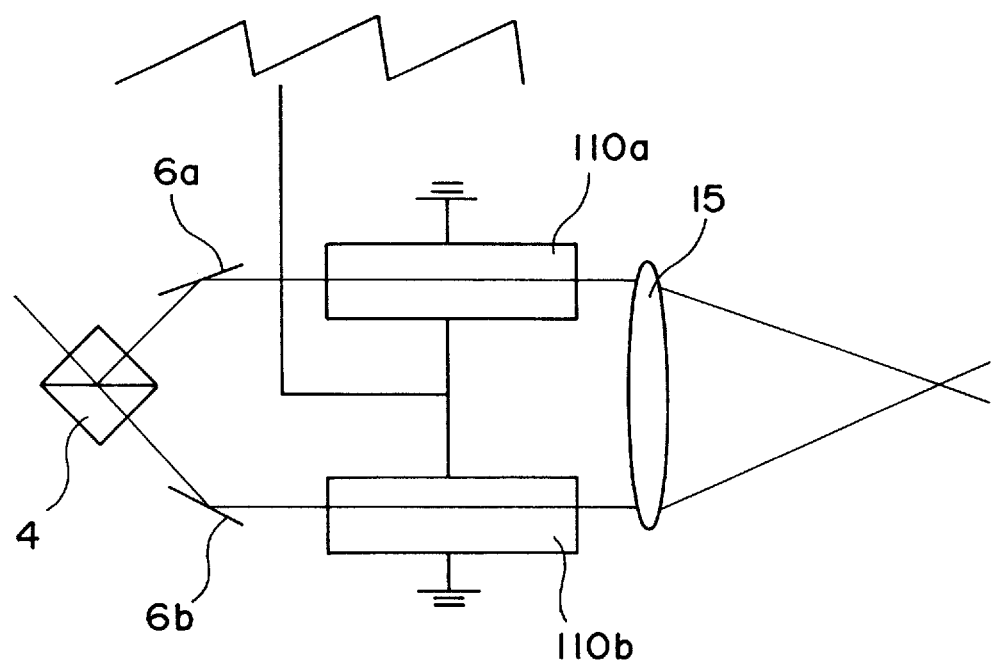
FIG. 4 illustrates an example by Foord et al.
Figure 5:
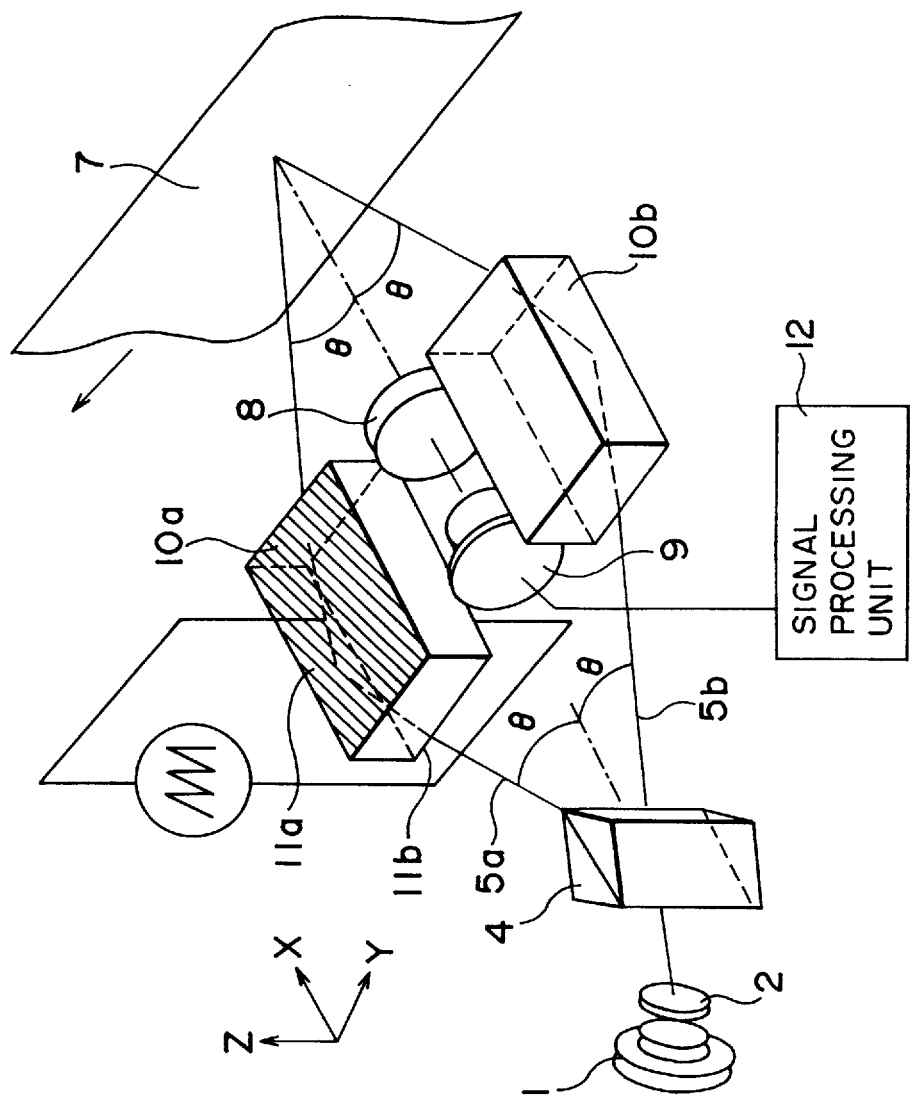
FIG. 5 shows a first embodiment of the present invention.

FIG. 5 is an illustration of the optical system portion of an LDV according to a first embodiment of the present invention. In FIG. 5, the same members as those in FIG. 1 are given the same reference characters. Light beams $5a$ and $5b$ both have directions of polarization parallel to the Z-axis, and are transmitted through electro-optical crystals (LiNbO$_3$) $10a$ and $10b$ of the same shape and the same characteristic. Electrodes $11a$ and $11b$ are provided only on the electro-optical crystal $10a$, and an electric field in the form of saw tooth wave (serodyne) as shown in FIG. 3 may be applied only to the light beam $5a$ portion in the direction of the Z-axis.

Description will hereinafter be made with LiNbO$_3$ taken as an example.

The refractive index ellipsoid of NiNbO$_3$ (3 m) is $$(1/No^2-\gamma_{22}E_2+\gamma_{13}E_3)X^2+(1/No^2+\gamma_{22}E_2+\gamma_{13}E_3)Y^2+(1/Ne^2+\gamma_{33}E_3)Z^2-2\gamma_{22}E_1XY+2\gamma_{51}E_2YZ+2\gamma_{51}E_1ZX=1 \quad (4)$$

When as in the embodiment of FIG. 5, an electric field is applied to the Z-axis ($E_3 \neq 0$, $E_1 = E_2 = 0$) and the direction of propagation of light is chosen in XY plane, the refractive index ellipsoid in a cross-section perpendicular to the direction of propagation of light is $$(1/No^2+\gamma_{13}E_3)(X^2+Y^2)+(1/Ne^2+\gamma_{33}E_3)Z^2=1 \quad (5)$$

where $\gamma$ is Pockels constant, and No and Ne are refractive indices of a normal ray of light and an abnormal ray of light, respectively.

From $Ne^2\gamma_{33}E_3<<1$, equation (5) is simplified as follows:

$$(X^2+Y^2)/No^2(1-No^2\gamma_{13}E_3/2)^2+Z^2/Ne^2(1-Ne^2\gamma_{33}E_3/2)^2=1 \quad (6)$$

When the direction of polarization of the light beam I is chosen in the Z-axis, attention can be paid only to Z and the refractive index $N(E_3)$ by the electric field is $$N(E_3)=Ne(1-Ne^2\gamma_{33}E_3/2) \quad (7)$$

When the thickness of LiNbO$_3$ is d, the voltage $V=E_3d$, and when the wavelength of the light beam I is $\lambda$, the phase difference $\Gamma(V)$ of the light relative to the difference in voltage after the transmission through LiNbO$_3$ of a length l is $$\begin{aligned}\Gamma(V) &= (2\pi/\lambda)\{N(V/d)-N(0)\}l \\ &= -\pi Ne^3\gamma_{33}lV/\lambda d\end{aligned} \quad (8)$$

and when the varying voltage V of the voltage applied to this crystal per unit time is made constant, the light after transmission through LiNbO$_3$ becomes constant in the amount of phase variation per unit time. That is, the crystal becomes a frequency shifter. This electro-optical crystal is serodyne-driven as shown in FIG. 3.

Figure 2:
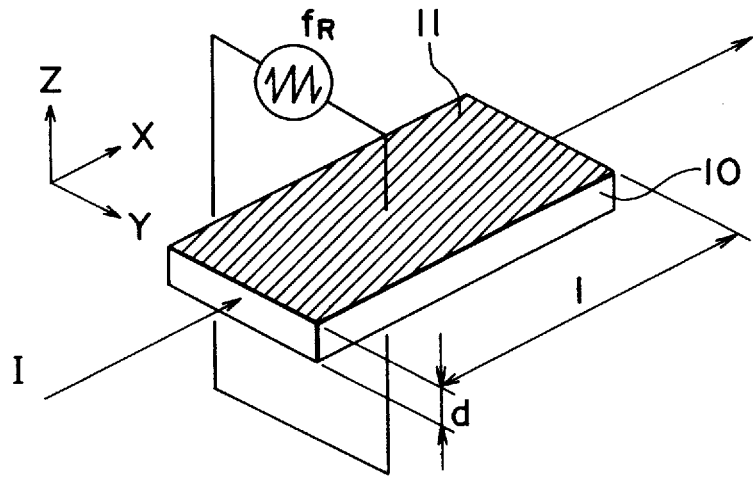
FIG. 2 is an illustration of a frequency shifter using electro-optical crystal.

When the shape of the electro-optical crystals $10a$ and $10b$ is such as that in FIG. 2, the thickness d=1 mm and the length l=20 mm and the wavelength of the laser beam is $\lambda$=780 nm, the substantial length l' over which the light beam $5a$ and $5b$ are transmitted through the electro-optical crystals $10a$ and $10b$ is $$l'=l\cos(\theta'), \quad (9)$$

where $\theta'$ is the angle of the light beams in the electro-optical crystals, and $$\sin(\theta)=Ne\cdot\sin(\theta'). \quad (10)$$

When $\theta=30°$, l'=20.54 mm, and the voltage amplitude is V≃224 V and the phase difference between the two light beams is $2\pi$. Serodyne driving is executed at this voltage amplitude. When serodyne driving is effected at a frequency fR, the passed light beam is frequency-shifted by fR.

A laser beam emitted from a laser 1 is made into a parallel light beam by a collimator lens 2 and is divided into two light beams $5a$ and $5b$ at an angle $2\theta$ by a beam splitter 4. The two light beams $5a$ and $5b$ enter the electro-optical crystals $10a$ and $10b$, respectively, at an angle $\theta$, and are reflected and deflected by the inner sides of these electro-optical crystals, and the two light beams are applied to an object 7 to be measured moving at a velocity V, at an angle of incidence $\theta$. The scattered light by the object or fluid is detected by a photodetector 9 through a condensing lens 8. The detection signal from the photodetector 9 includes a Doppler beat signal as shown in the aforementioned equation (3), and the velocity V is calculated from equation (3) by a signal processing unit 12 on the basis of the obtained beat frequency F and the known values of $\theta$, $\lambda$ and FR.

As described above, design is made such that the light beams are deflected in the electro-optical crystals and therefore, the shifter can also be used as the light beam deflecting member, and this leads to the simplification and downsizing of the apparatus.

Figure 6:
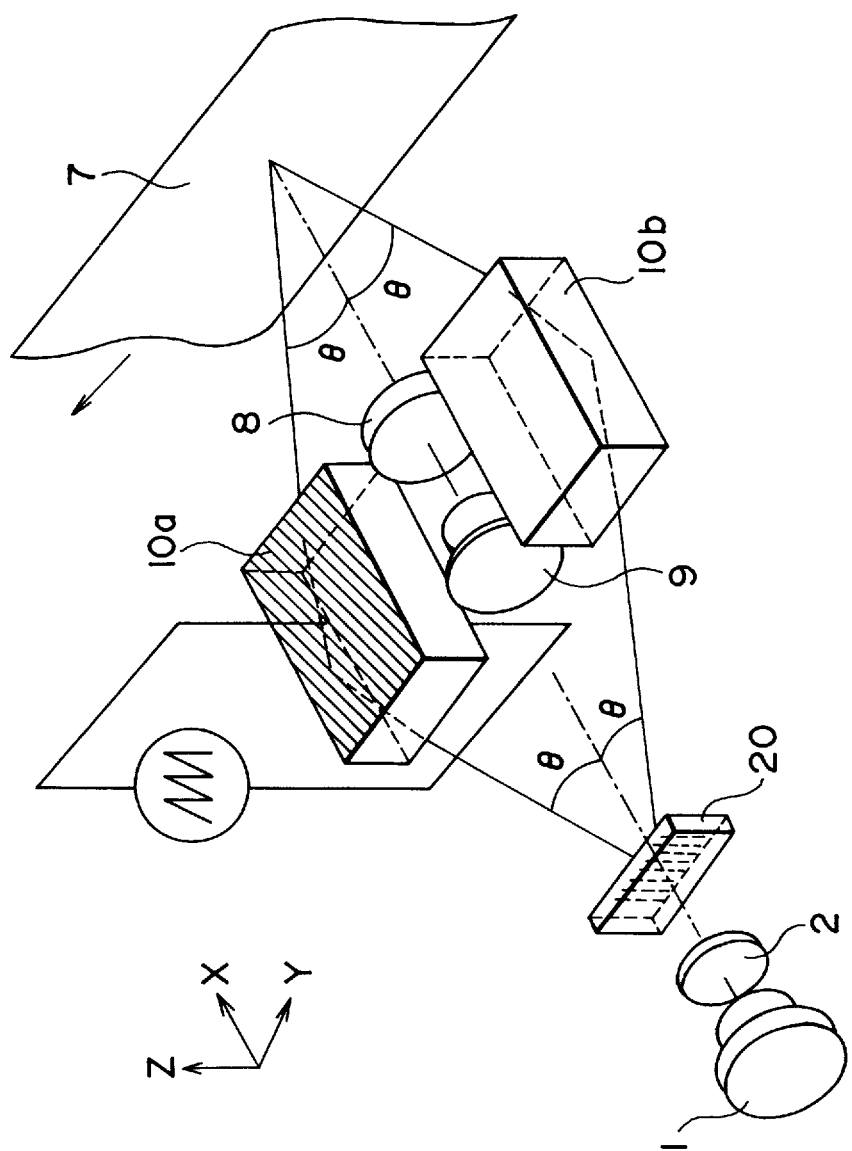
FIG. 6 shows a second embodiment of the present invention.

FIG. 6 is an illustration of the optical system portion of an LDV according to a second embodiment of the present invention. In FIG. 6, members similar to those in the apparatus of FIG. 5 are given the same reference characters and need not be described again. In the present embodiment, the beam splitter is replaced by a diffraction grating 20 of grating pitch d. At this time, the angle of diffraction θ is $$d\sin\theta = \lambda \tag{11}$$

The two light beams 5a and 5b enter the electro-optical crystals 10 at an angle θ and are reflected and deflected by the inner sides thereof, and the two light beams are applied to the object 7 to be measured moving at a velocity V, at an angle of incidence θ. The scattered light by the object or fluid is detected by the photodetector 9 through the condensing lens 8. At that time, the Doppler frequency is as follows as in equation (3) due to the frequency difference fR between the two light beams:

$$F = 2 \cdot V \cdot \sin(\theta)/\lambda + fR \tag{12}$$

From equation (11), equation (12) becomes $$F = 2 \cdot V/d + fR, \tag{13}$$

and it becomes possible to detect a signal having no dependency on the wavelength of the laser.

Again in the present embodiment, design is made such that the light beams are deflected in the electro-optical crystals and therefore, the shifter can be used also as the light beam deflecting member, and this leads to the simplification and downsizing of the apparatus. Particularly in the present embodiment, a portion of the optical system for obtaining a signal having no dependency on the wavelength of the laser can be provided by the shifter and therefore, further simplification and downsizing of the apparatus are realized.

While in the above-described embodiments, the voltage driving of the electro-optical crystal is described for only one light beam, two light beams may be reversely voltage-driven to thereby reduce the voltage value. Also, different electro-optical crystals are used for two light beams, but alternatively, these may be constructed of a common electro-optical crystal.

While an example of the application of the frequency shifter to the laser Doppler velocimeter has been shown above, a scale (diffraction grating) may be disposed on an object to be measured in an encoder. When a frequency shifter is applied thereto, the signal output is an AC signal even in a state in which the scale is stationary and therefore, the band of a sensor can be narrowed. Like the laser Doppler velocimeter, this is effective as a value added technique, including improving the signal-to-noise ratio.

As described above, according to each of the above-described embodiments, the optical system for deflection can also be used as the light beam modulating means, and the downsizing and simplification of the apparatus can be realized.

Particularly, two light beams are internally reflected and deflected in the electro-optical crystals, whereby it is unnecessary to discretely provide a deflecting mirror for causing the light beams to intersect each other and thus, the structure becomes simple and downsizing becomes possible.

Further, by using a diffraction grating as the beam splitter, it is possible to construct an optical system which reduces the wavelength dependency of the Doppler signal.

Furthermore, by making the inner reflecting portions of the electro-optical crystals parallel to each other, the wavelength dependency of the Doppler signal can be completely eliminated as shown in equation (13) and compactness and high reliability are achieved.

What is claimed is:

1. An apparatus for detecting displacement information of an object to be measured comprising:

a light source;

an electro-optical crystal disposed at an incidence position of a light beam from said light source, the light beam being modulated in said electro-optical crystal, the light beam being internally reflected at least once at the inner side in said electro-optical crystal and emerging therefrom; and a light receiving element for receiving the light from the object to be measured to which the light beam having been internally reflected at least once in and having emerged from said electro-optical crystal is applied, the displacement information of the object to be measured being detected by the light reception of said light receiving element.

2. The apparatus according to claim 1, further comprising a signal processing unit for processing an output signal from said light receiving element and calculating the velocity of the object to be measured.

3. The apparatus according to claim 1, further comprising voltage applying means for applying a voltage to said electro-optical crystal.

4. The apparatus according to claim 3, wherein said voltage applying means applies a voltage of saw tooth waveform to said electro-optical crystal.

5. The apparatus according to claim 1, wherein said electro-optical crystal is a crystal of $LiNbO_3$.

6. An apparatus for detecting displacement information of an object to be measured comprising:

a light source;

a beam splitter for separating a light beam from said light source into two light beams;

at least one electro-optical crystal disposed at the incidence positions of the two light beams separated by said beam splitter, at least one of said two light beams being modulated in said electro-optical crystal, said two light beams being internally reflected at least once at the inner side in said electro-optical crystal and emerging therefrom; and a light receiving element for receiving the light from the object to be measured to which the two light beams having been internally reflected at least once in and having emerged from said electro-optical crystal are applied while intersecting each other, the displacement information of the object to be measured being detected by the light reception of said light receiving element.

7. The apparatus according to claim 6, further comprising a signal processing unit for processing an output signal from said light receiving element and calculating the velocity of the object to be measured.

8. The apparatus according to claim 6, wherein said beam splitter is a diffraction grating.

9. The apparatus according to claim 8, wherein the reflecting surfaces of said at least one electro-optical crystal which internally reflects the two light beams are parallel to each other.

10. The apparatus according to claim 6, further comprising voltage applying means for applying a voltage to at least a portion of said at least one electro-optical crystal.

11. The apparatus according to claim 10, wherein said voltage applying means applies a voltage of saw tooth waveform to at least a portion of said at least one electro-optical crystal.

12. The apparatus according to claim 6, wherein said at least one electro-optical crystal is a crystal of $LiNbO_3$.

* * * * *

UNITED STATES PATENT AND TRADEMARK OFFICE
CERTIFICATE OF CORRECTION

PATENT NO. : 5,774,218
DATED : June 30, 1998
INVENTOR(S) : Takamiya et al.

It is certified that error appears in the above-identified patent and that said Letters Patent is hereby corrected as shown below:

COLUMN 4:

Line 29, "beam" should read --beams--.

COLUMN 5:

Line 56, "simple" should read --simpler--.

Signed and Sealed this

Eleventh Day of May, 1999

Attest:

Q. TODD DICKINSON

Attesting Officer

Acting Commissioner of Patents and Trademarks